(12) United States Patent  
Touhent

(10) Patent No.: US 12,434,339 B2  
(45) Date of Patent: Oct. 7, 2025

(54) SYSTEM FOR PERFORMING WORK PROCESSES ON WORKPIECES OR THE LIKE

(71) Applicant: Robert Bosch GmbH, Stuttgart (DE)

(72) Inventor: Sami Touhent, Moessingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 110 days.

(21) Appl. No.: 18/698,641

(22) PCT Filed: Oct. 10, 2022

(86) PCT No.: PCT/EP2022/078070  
§ 371 (c)(1),  
(2) Date: Apr. 4, 2024

(87) PCT Pub. No.: WO2023/061921  
PCT Pub. Date: Apr. 20, 2023

(65) Prior Publication Data  
US 2024/0316704 A1  Sep. 26, 2024

(30) Foreign Application Priority Data

Oct. 11, 2021  (DE) ................... 10 2021 211 426.1

(51) Int. Cl.  
*B23Q 7/14* (2006.01)  
*B23P 23/06* (2006.01)

(52) U.S. Cl.  
CPC ............... *B23P 23/06* (2013.01); *B23Q 7/14* (2013.01)

(58) Field of Classification Search  
CPC ........... B23P 23/06; B23Q 7/14; B65G 47/52; B65G 54/02  
See application file for complete search history.

(56) References Cited

U.S. PATENT DOCUMENTS 9,540,190 B2 * 1/2017 Jochim ................. B65G 35/00  
2021/0265188 A1 8/2021 Moura et al.

FOREIGN PATENT DOCUMENTS

| DE | 10297167 T5 | 7/2004 |
| DE | 102010028769 A1 | 11/2011 |
| DE | 102011053538 A1 | 3/2013 |
| DE | 102014214696 A1 | 1/2016 |
| DE | 102018006259 A1 | 12/2019 |
| WO | 03038869 A2 | 5/2003 |
| WO | 2013098202 A1 | 7/2013 |

OTHER PUBLICATIONS

International Search Report for PCT/EP2022/078070, Issued Feb. 10, 2023.

* cited by examiner

*Primary Examiner* — Lee A Holly  
(74) *Attorney, Agent, or Firm* — NORTON ROSE FULBRIGHT US LLP

(57) ABSTRACT

A system for performing work processes on workpieces or the like. The system includes at least two first process stations for performing, in each case, a first work process on the workpiece or the like with a first process duration and at least one second process station for performing a second work process on the workpiece or the like with a second process duration, wherein the first process duration and the second process duration are of different lengths, and including a transport surface on which the workpieces or the like are movable individually on transport units by means of electromagnetic drives.

11 Claims, 1 Drawing Sheet

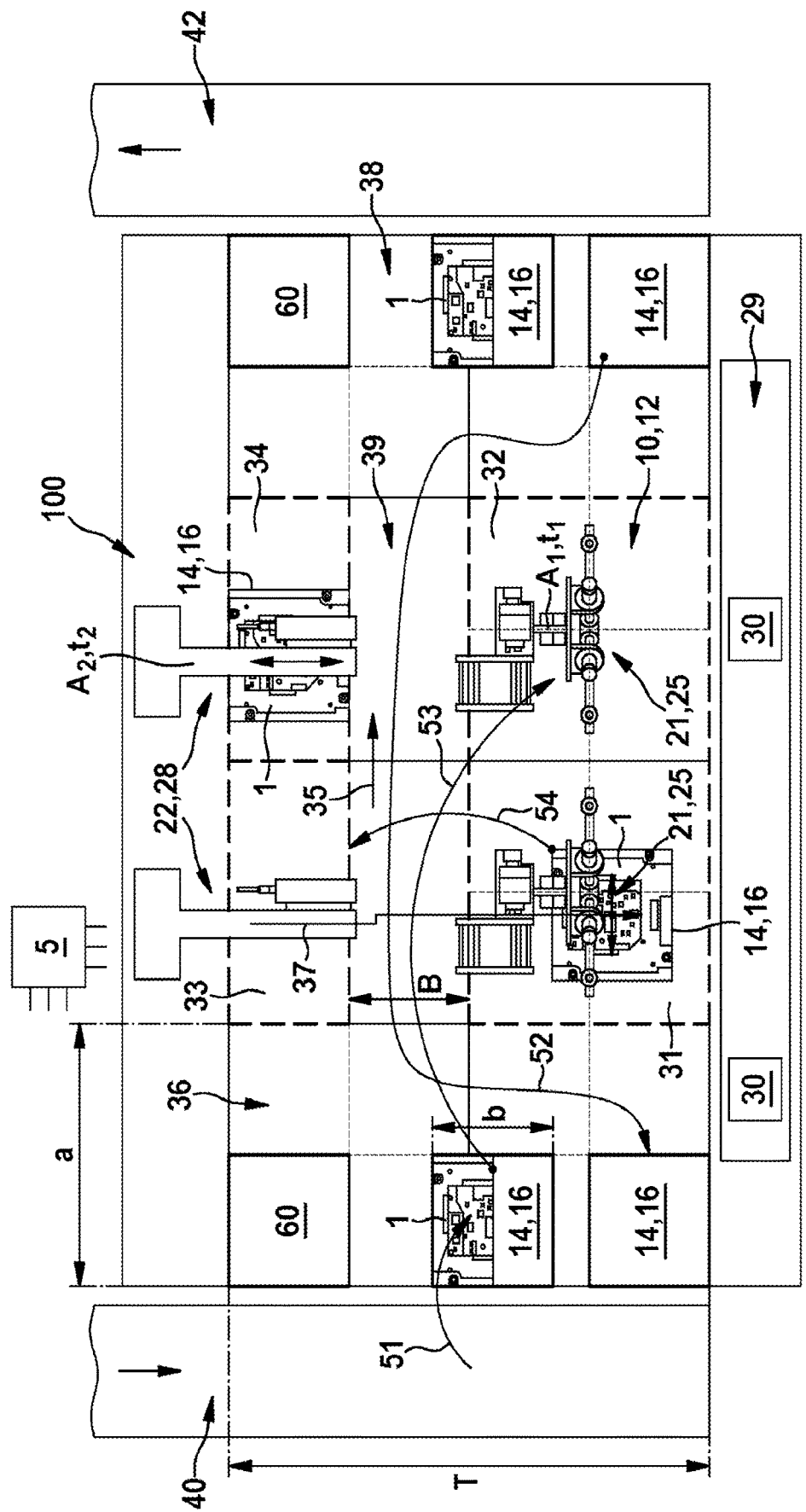

SYSTEM FOR PERFORMING WORK PROCESSES ON WORKPIECES OR THE LIKE

FIELD

The present invention relates to a system for performing work processes on workpieces or the like, which makes it possible to optimize the work processes with a relatively low space requirement.

BACKGROUND INFORMATION

German Patent Application No. DE 10 2018 006 259 A1 describes a system with electromagnetically movable transport units which are freely movable independently of one another on a work surface. Processing stations or process stations for performing work processes on the workpieces, assemblies or the like are located at the edge of the work surface.

German Patent Application Nos. DE 10 2014 214 696 A1 and DE 102 97 167 T5 also describe systems which have magnetically driven transport units in the form of so-called movers which are movable independently of one another and movable past one another. The movers serve to feed the workpieces, assemblies or the like to different process stations for performing work processes.

BACKGROUND INFORMATION

A system according to the present invention for performing work processes on workpieces or the like may have the advantage of making it possible to optimize the sequence and the execution of work processes, in which a plurality of work processes having different processing times are provided in the region of the system. In particular, the system according to the present invention makes it possible for the workpieces or the like conveyed by the transport units to be fed in an optimized manner in terms of process technology to the process stations or processing stations which are free or available with respect to performing the necessary work processes.

The present invention is based on the idea of realizing different transport paths for the transport units in the region of a transport surface on which the transport units are controllable so as to be movable individually and freely, without the individual transport units disturbing or being in the way of one another when the transport paths are executed.

Against the background of the above explanations, in a system according to an example embodiment of the present invention for performing work processes on workpieces or the like, at least two first process stations for performing, in each case, a first work process on the workpiece or the like with a first process duration and at least one second process station for performing a second work process on the workpiece or the like with a second process duration are provided, wherein the first process duration and the second process duration are of different lengths, wherein the first process duration is in particular longer than the second process duration, a transport surface on which the workpieces or the like are movable individually on transport units by means of electromagnetic drives is provided, wherein the transport units are designed to take over the workpieces or the like from a first conveying device in the region of a takeover zone, subsequently to feed them to a first process station and then to a second process station, and finally to transfer them to a second conveying device in the region of a transfer zone, transport paths for the transport units between the takeover region, the at least two process stations and the transfer region are provided, wherein the at least two first process stations are arranged one behind the other or one after the other with respect to the transport path of a transport unit when viewed in a transport direction of the transport unit, wherein, between the takeover region and the transfer region, a travel route continuously free of process stations is formed for the transport units, the width of said travel route corresponding to at least the width of a transport unit, and wherein a control device for controlling the transport units is provided, which is designed to carry out control in such a way that, depending on the availability of free process stations, the process stations are approached by the transport units with a view to a lowest possible total process duration of the workpieces or the like to be processed, taking into account any required order of performing the work processes.

Advantageous developments of the system according to the present invention for performing work processes on workpieces or the like are disclosed herein.

According to an example embodiment of the present invention, a particularly preferred arrangement of the process stations in the region of the transport surface provides that the number of the first process stations and of the second process stations is the same, and that a second process station is assigned to each first process station, wherein the two mutually assigned process stations are arranged on opposite sides of the travel route, and wherein a connecting line between the two mutually assigned process stations crosses the travel region at a right angle. Such an arrangement of first and second process stations makes it possible to minimize the transport path between the first and second process stations.

Alternatively, it may also be provided that the number of the first process stations is greater than the number of the second process stations, and that a second process station is assigned to a plurality of first process stations. Such a design has the advantage that the number of the second process stations can be minimized and the device-related cost of the system can thus be reduced.

With a view to the above-described embodiment, it is moreover particularly preferably provided that the second process station is arranged with respect to the transport path on the side of the transport surface facing the transfer region. Such an arrangement likewise makes it possible to minimize the transport paths of the workpieces or the like between the individual process stations.

According to an example embodiment of the present invention, a further optimization with regard to the time sequence when handling the workpieces or the like during the takeover from the first conveying device until the transfer to the second conveying device provides that the takeover region and the transfer region each have a plurality of parking spaces which can be approached as required by the transport units.

Furthermore, according to an example embodiment of the present invention, the at least one second process station may be a test station.

According to an example embodiment of the present invention, it is moreover preferably provided that the at least two first process stations are discharging devices for dispensing a pasty medium, and the discharging devices have raisable and lowerable as well as horizontally movable dispensing devices, in particular dosing needles, for the medium.

According to an example embodiment of the present invention, for feeding and removing the workpieces or the like, it is particularly preferably provided that the first and the second conveying device are designed as linear conveyors.

At least one additional third process station may also be provided.

In particular, before the system or the process stations are put into operation, it may be necessary to check them for proper functioning or to calibrate them. In this case, it is particularly preferably provided that at least one service transport unit is present in the region of the work surface and is designed to convey a calibration device or a test device or a component of the mentioned devices into the region of a process station.

Further advantages, features, and details of the present invention can be found in the following description of preferred embodiments of the present invention and with reference to the FIGURE.

BRIEF DESCRIPTION OF THE DRAWING

FIG. 1 shows is a simplified plan view of a system for performing work processes on workpieces or the like, according to an example embodiment of the present invention.

DETAILED DESCRIPTION OF EXAMPLE EMBODIMENTS

FIG. 1 is a highly simplified view of a system 100 for performing work processes on workpieces 1 or the like. The system 100 has a work surface 10, which is rectangular in the exemplary embodiment and which simultaneously forms a transport surface 12 for transport units 14 in the form of so-called movers 16 which are movable independently of one another and controllable by a control device 5 by means of electromagnetic drives (not shown). The transport units 14 or movers 16 are each used for transporting or receiving, in the exemplary embodiment, a single workpiece 1, which is fed by means of the transport units 14 to a first process station 21 and subsequently to a second process station 22.

The system 100 is characterized in that at least two first process stations 21 and at least one second process station 22 are present. In the exemplary embodiment shown, the first process station 21 is a dosing device or discharging device 25, which is designed to locally dispense a pasty medium onto the workpiece 1 by means of a raisable and lowerable as well as horizontally movable dispensing device, in particular in the form of a dosing needle.

It is moreover characteristic that performing a first work process $A_1$ by means of the first process station 21 requires a first process duration $t_1$. In contrast, the second process station 22 is, by way of example, a test station which uses a camera 28 to check the correct application of the medium previously applied to the workpiece 1 at the first process station 21. It is characteristic for the second work process $A_2$ performed by the second process unit 22 that the process duration $t_2$ thereof is shorter than the process duration $t_1$ of the first work process $A_1$. Furthermore, it is necessary that, before the second work process $A_2$ is performed, the first work process $A_1$ has been performed first.

The lower edge of the representation of FIG. 1 moreover shows a strip-shaped zone 29, in the region of which, for example, at least one third process station 30 for performing a further work process on the workpiece 1 can be arranged.

The work surface 10 of the system 100 can be subdivided into four, by way of example respectively rectangular, work regions 31 to 34, the outer boundaries of which are respectively shown with dashed lines, within which boundaries the two first process stations 21 and the two second process stations 22 are arranged. The two first process stations 21 are moreover arranged next to one another or one after the other with respect to a direction of a transport path 35, as are the two second process stations 22.

A travel route 39 for the transport units 14 or the movers 16 is formed between the first process stations 21 and the second process stations 22 on the work surface 10, the width B of said travel route corresponding to at least the width b of a transport unit 14 or of a mover 16 when viewed in the direction of the transport path 35. A first process station 21 and a second process station 22 are in each case arranged on opposite sides of the travel route 39, namely in such a way that a connecting line 37 between the two process stations 21, 22 runs at a right angle to the travel route 39. This means that the shortest possible distance is formed between the two process stations 21, 22 if they are approached one after the other.

In addition to the work zones 31 to 34, a takeover region 36 and a transfer region 38 are provided laterally as parts of the work surface 10, which respectively have, by way of example, a rectangular design and extend over the entire depth T of the work surface 10. In addition, the takeover region 36 and the transfer region 38 each have a lateral extension a, which corresponds to at least twice the width b or extension of the transport units 14 or movers 16, which in the exemplary embodiment have a square base, so that the takeover region 36 and the transfer region 38 respectively form a plurality of parking spaces for the transport units 14.

The workpieces 1 are fed to the system 100 by means of at least one first conveying device 40, which is designed as a linear conveyor and which is shown only in a simplified manner in the representation of FIG. 1. After the workpieces 1 have passed through the process stations 21 and 22, they are removed or transported away by means of at least one second conveying device 42, which is likewise designed in the form of a linear conveyor. The workpieces 1 are typically transported on workpiece carriers (not shown) on the two conveying devices 40, 42. The takeover of the workpieces 1 from the first conveying device 40 onto the transport units 14 or the movers 16 and the transfer of workpieces 1 from a transport unit 14 or a mover 16 to the second conveying device 40 takes place by means of at least one gripping device (not shown in FIG. 1), which is designed to lift a workpiece 1 from the first conveying device in each case and to deposit it onto an empty mover 16 located in the transfer region 36. The gripping device also serves to lift a processed workpiece 1 from a mover 16 and to transfer it to the second conveying device 42.

The arrow 51 in FIG. 1 illustrates that a workpiece 1 from the first conveying device 40 has been deposited by means of the gripping device onto a mover 16. Shown in simplified form below this mover 16 is a further mover 16, which has been conveyed back from the transfer region 38 into the takeover region 36 according to the arrow 52. The mover 16 loaded with the workpiece 1 in the takeover region 36 can, for example, be fed according to the arrow 53 to the first process station 21, which is arranged on the side facing the transfer region 38. Furthermore, it can be seen from the arrow 54 that a workpiece 1 previously treated with the medium in the first process station 21 is subsequently conveyed into the region of the one second process station 22. In particular, it can be seen from the course of the arrows 51 to 54 that mutually independent movements of the transport units 14 or of the movers 16 are made possible since a travel route 39, which is always free even if the process stations 21, 22 are occupied by transport units 14, is available between the process stations 21 and 22.

The control device 5 controls the feeding of the individual transport units 14 or movers 16, with workpieces 1 located thereon, to the process stations 21, 22 in such a way that a free first process station 21 is preferably always approached first since the work process $A_1$, which is critical with a view to a total process time (consisting of the sum of the two process durations $t_1$ and $t_2$, is performed there. This is also possible because the free travel route 39 always remains for a transport unit 14 even if process stations 21, 22 are fitted with workpieces 1 or transport units 14.

The system 100 described thus far can be altered or modified in many ways without deviating from the idea of the present invention. In particular, it is explained that, in contrast to the described exemplary embodiment, in which the number of the first process stations 21 and of the second process stations 22 is the same, the number of the first process stations 21 may also be greater than the number of the second process stations 22. Generally speaking, with a view to the highest possible performance of the system 100, the number of process stations for performing different work processes is selected in such a way that, as the process working time of a work process increases, a higher number of the process station performing this work process is provided.

Furthermore, the work regions 31 to 34 on the work surface 10 form a 2×2 matrix with two rows and two columns of a first. Of course, system designs with an n×m matrix are also possible, wherein the values of n and m may be the same or different. However, for optimizing the performance of the system 100, a free travel route 39 between each two rows running in the conveying direction of the objects 1 may be useful or required in this case.

In addition to the transport units 14 or movers 16, it is also possible for at least one service transport unit 60 to be present in the region of the work surface 10, which service transport unit is designed to convey a calibration device or a test device or a component of the mentioned devices into the region of a process station 21, 22 in order to ensure the functionality of the process station 21, 22. The drive of the service transport unit 60 is designed analogously to that of the transport units 14.

The invention claimed is:

1. A system for performing work processes on workpieces, comprising:
at least two first process stations, each configured to perform a first work process on at least one workpiece with a first process duration;
at least one second process station configured to perform a second work process on the at least one workpiece with a second process duration, wherein the first process duration and the second process duration are of different lengths;
a transport surface on which the at least one workpiece are movable individually on transport units using electromagnetic drives, wherein the transport units are configured to take over the at least one workpiece from a first conveying device in a region of a takeover zone, subsequently feed the at least one workpiece to a first process station of the at least two first process stations and then to a second process station of the at least one second process stations, and transfer the at least one workpiece to a second conveying device in a region of a transfer zone;
transport paths for the transport units between the takeover region, the first and second process stations, and the transfer region, wherein the at least two first process stations are arranged one behind the other or one after the other with respect to the transport path of a transport unit when viewed in a transport direction of the transport units, wherein, between the takeover region and the transfer region, a travel route continuously free of process stations is formed for the transport units, a width of the travel route corresponding to at least the width of a transport unit; and
a control device configured to control the transport units, the control device being configured to control the transport units depending on an availability of free process stations to approach the first and second process stations with a view to a lowest possible total process duration of the at least one workpiece to be processed, taking into account any required order of performing the first and second work processes.

2. The system according to claim 1, wherein a number of the first process stations is greater than a number of the second process stations, and each respective second process station is assigned to a plurality of first process stations.

3. The system according to claim 2, wherein each second process station is arranged with respect to the transport path of a transport unit on a side of the transport surface facing the transfer region.

4. The system according to claim 1, wherein a number of the first process stations and of the second process stations is the same, and a different respective second process station is assigned to each respective first process station, the assigned respective first and second process stations being arranged on opposite sides of the travel route, and a connecting line between the assigned first and second process stations crossing the travel route at a right angle.

5. The system according to claim 1, wherein the takeover region and the transfer region each have a plurality of parking spaces which can be approached as required by the transport units.

6. The system according to claim 1, wherein the at least one second process station is a test station.

7. The system according to claim 1, wherein the at least two first process stations are discharging devices for dispensing a pasty medium, and the discharging devices have raisable, lowerable, and horizontally movable dispensing devices including dosing needles for the medium.

8. The system according to claim 1, wherein the first and the second conveying devices are linear conveyors.

9. The system according to claim 1, further comprising:
at least one additional third process station.

10. The system according to claim 1, wherein at least one service transport unit is present in the region of the transport surface, the service transport unit being configured to convey a calibration device or a test device or a component of the calibration or test devices into a region of a first or second process station.

11. The system according to claim 1, wherein the second process duration of the second work process is shorter than the first process duration of the first work process, wherein the first work process is performed prior to the second work process.

* * * * *